United States Patent
Gapontsev et al.

(10) Patent No.: US 9,882,341 B2
(45) Date of Patent: Jan. 30, 2018

(54) HIGH POWER SINGLE MODE FIBER LASER SYSTEM FOR WAVELENGTHS OPERATING IN 2 µM RANGE

(75) Inventors: Valentin Gapontsev, Worchester, MA (US); Fedor Shcherbina, Burbach (DE); Andrey Mashkin, Nelphen (DE)

(73) Assignee: IPG PHOTONICS CORPORATION, Oxford, MA (US)

( * ) Notice: Subject to any disclaimer, the term of this patent is extended or adjusted under 35 U.S.C. 154(b) by 822 days.

(21) Appl. No.: 14/070,927

(22) PCT Filed: May 3, 2011

(86) PCT No.: PCT/US2011/034997
§ 371 (c)(1),
(2), (4) Date: Apr. 2, 2014

(87) PCT Pub. No.: WO2012/150935
PCT Pub. Date: Nov. 8, 2012

(65) Prior Publication Data
US 2016/0164244 A1    Jun. 9, 2016

(51) Int. Cl.
*H01S 3/30* (2006.01)
*H01S 3/094* (2006.01)
*H01S 3/067* (2006.01)
*H01S 3/16* (2006.01)
*H01S 3/00* (2006.01)

(52) U.S. Cl.
CPC ...... *H01S 3/094042* (2013.01); *H01S 3/0675* (2013.01); *H01S 3/06729* (2013.01); *H01S 3/06733* (2013.01); *H01S 3/06754* (2013.01); *H01S 3/1608* (2013.01); *H01S 3/1616* (2013.01); *H01S 3/0092* (2013.01); *H01S 3/094007* (2013.01)

(58) Field of Classification Search
CPC ............. H01S 3/094042; H01S 3/1616; H01S 3/1608; H01S 3/06754; H01S 3/06733; H01S 3/06729
See application file for complete search history.

(56) References Cited

U.S. PATENT DOCUMENTS

| | | | | |
|---|---|---|---|---|
| 5,818,630 A * | 10/1998 | Fermann | ................. | H01S 3/067 359/340 |
| 7,872,794 B1 * | 1/2011 | Minelly | .............. | H01S 3/06758 359/337.13 |
| 2003/0169489 A1 * | 9/2003 | Jiang | ........................ | C03C 3/17 359/341.5 |
| 2009/0010596 A1 * | 1/2009 | Matthijsse | ......... | H04B 10/2581 385/32 |
| 2009/0190615 A1 * | 7/2009 | Jiang | .................... | H01S 3/0675 372/6 |

(Continued)

*Primary Examiner* — Yuanda Zhang
(74) *Attorney, Agent, or Firm* — Yuri B. Kateshov, Esq.; Timothy J. King, Esq.

(57) ABSTRACT

A high power fiber laser system is configured with a pump cascade and a laser cascade. The pump cascade includes a fiber amplifier provided with a MM core which is doped with ions of rare-earth element including either Er or Yb/Er. The MM core of fiber amplifier is configured with a double bottleneck-shaped cross section. The laser cascade has a fiber laser configured with a core which is doped with Tm ions. The pump light generated by the amplifier is coupled into the upstream end of the Tm laser.

12 Claims, 1 Drawing Sheet

(56) References Cited

U.S. PATENT DOCUMENTS

| | | | |
|---|---|---|---|
| 2010/0098112 A1* | 4/2010 | Gapontsev | H01S 3/0064 372/3 |
| 2011/0019700 A1* | 1/2011 | Jiang | H01S 3/067 372/6 |
| 2011/0064097 A1* | 3/2011 | Gapontsev | H01S 3/0672 372/6 |
| 2012/0205352 A1* | 8/2012 | Fermann | H01S 3/06725 219/121.67 |
| 2012/0236314 A1* | 9/2012 | Fermann | G02F 1/365 356/479 |

* cited by examiner

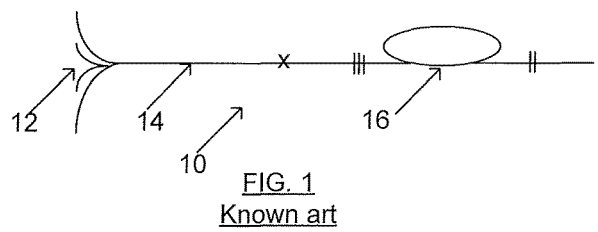
FIG. 1
Known art
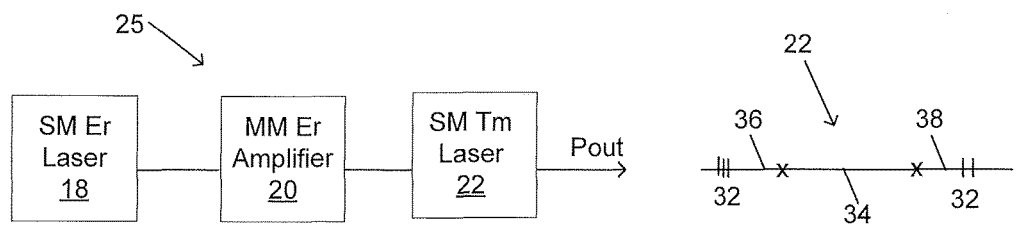
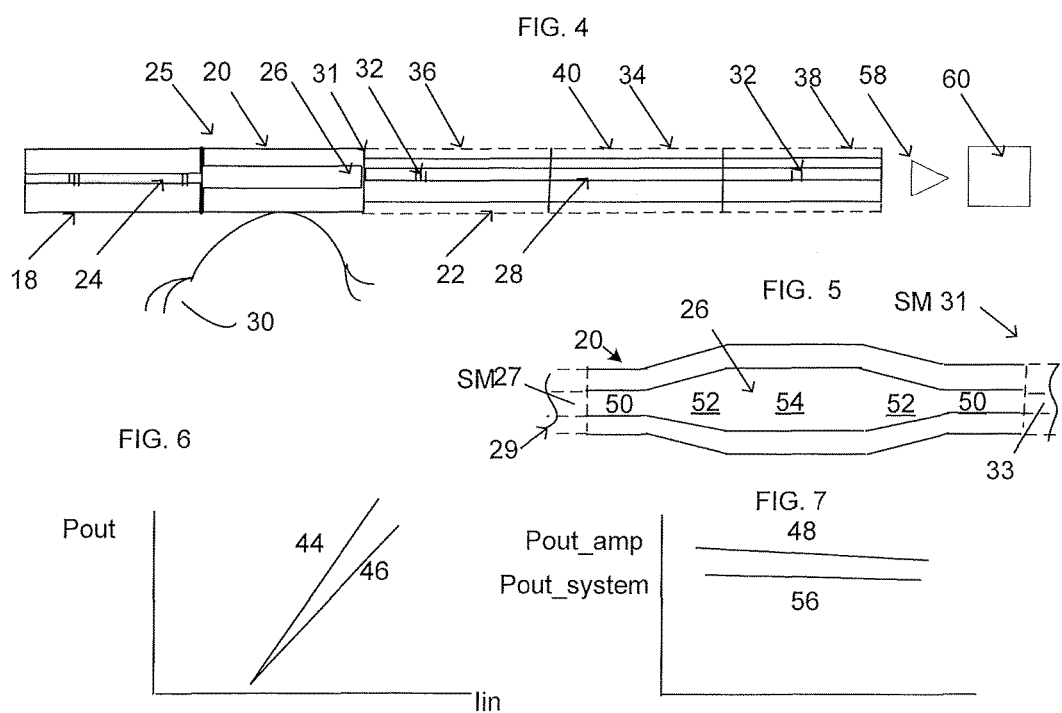

HIGH POWER SINGLE MODE FIBER LASER SYSTEM FOR WAVELENGTHS OPERATING IN 2 µM RANGE

BACKGROUND OF THE DISCLOSURE

Field of the Disclosure

The disclosure relates to high power fiber lasers. In particular, the disclosure relates to high power single mode fiber laser systems operating in an about 2 µm range.

Prior Art Discussion

Thulium-based ("Tm") fiber lasers meet the growing demand of industrial, medical and R&D markets for high power, compact, efficient, wavelength selectable, single mode CW and pulsed sources of the spectral range around 2000 nm. These lasers provide many advantages over traditional bulk Ho:YAG lasers because of their low maintenance, small size, high efficiency and ease of operation.

With continuously growing higher powers and new options, Tm lasers provide an ideal solution for laboratory, medical and industrial market segments combining a unique wall-plug efficiency with diffraction limited beam, turnkey maintenance-free operation, single mode fiber delivery, compact size and air-cooled simplicity. These laser systems have been field tested and deployed in a variety of industrial, R&D, medical and airborne applications. However, Tm lasers may not always perform as desired at high power levels. Besides, the compactness of existing Tm lasers or rather lack thereof may quite often be a reason for concern.

FIG. 1 illustrates one of known single-mode (SM) Tm-based high power fiber laser systems 10 including a plurality of SM erbium-doped (Er) fiber lasers which are combined defining a combiner 12. The combiner 12 is thus configured with an output fiber 14 that can deliver pump light to a SM Tm laser 16. The number of SM Er fiber lasers combined together is not unlimited. Increasing the number of SM Er lasers leads to a more complicated and less compact system.

A need therefore exists for a high power fiber laser including a Tm-doped fiber laser that effectively and efficiently operates at high power levels.

A further need exists for a high power fiber laser system including a Tm-based fiber laser and having a compact structure.

SUMMARY OF THE DISCLOSURE

These needs are satisfied by the disclosed fiber laser system. In particular, the system is configured with a multimode (MM) Erbium-doped ("Er") or ytterbium (Yb)/Er-doped double bottleneck-shaped fiber amplifier which radiates a multimode pump light coupled into a SM Tm fiber laser.

BRIEF DESCRIPTION OF THE DRAWINGS

The above and other features and advantages of the disclosed system will be more readily understood from the following description discussed in conjunction with the drawings in which:

FIG. 1 illustrates a general optical schematic of a known Tm-based high power fiber laser systems.

FIG. 2 illustrates a general optical schematic of the disclosed system.

FIG. 3 diagrammatically illustrates a structure of a Tm fiber laser in accordance with the disclosure.

FIG. 4 diagrammatically illustrates a waveguide of the disclosed system.

FIG. 5 illustrates a configuration of MM Er doped-based amplifier used in the disclosed fiber laser system and having a double bottleneck-shaped active fiber.

FIG. 6 illustrates the comparative efficiency of the system of FIG. 1 and presently disclosed system.

FIG. 7 illustrates the stability of the output of the disclosed system.

SPECIFIC DESCRIPTION

Reference will now be made in detail to the disclosed system. The drawings are in simplified form and are far from precise scale. The word "couple" and similar terms do not necessarily denote direct and immediate connections, but also include connections through intermediate elements or devices.

FIG. 2 illustrates a disclosed fiber laser system 25 includes, among others, with a pump configured with a single mode ("SM") Er-based lasers 16 which is coupled to a multimode ("MM") Er fiber amplifier 20. Although only one Er amplifier 20 is illustrated, the scope of the disclosure includes the use of a plurality of such fiber amplifiers which have respective outputs optically combined. The Er MM amplifier or amplifiers 20 radiate a pump light coupled into a Tm laser 22 which emits an output light at about 2 µm wavelength. As can be seen, system 25 is very compact.

The use of double clad Tm fiber 22 has a row of advantages. For example, high power density pump light can be coupled into a waveguiding outer cladding of fiber laser 22. Furthermore, a relatively low cladding/core ratio of Tm fiber laser 22 provides an effective absorption of pump light by a gain medium. Also, Tm fiber laser 22 may have a relatively short fiber length which allows increasing a threshold for nonlinear effects. Preferably, Tm laser 22 is based on a SM active fiber; however, a MM Tm-doped fiber can be practiced within the scope of the disclosure.

FIG. 3 shows a configuration common to both Er-based and Tm-based oscillators 18 and 22, respectively, of system 25 as discussed further in reference to Tm laser 22 only. Generally the oscillators each have a Fabry-Perot structure characterized by a resonant cavity which is defined between wavelength-selective components 32 such as mirrors or fiber Bragg gratings. An active fiber 34 has its opposite ends spliced directly to respective ends of input and output SM passive fibers 36 and 38, respectively. The above-disclosed configuration of a laser is disclosed in more details in U.S. Pat. Nos. 5,422,897 and 5,774,484, respectively, which are commonly owned with the present disclosure and fully incorporated herein by reference.

FIG. 4, discussed in conjunction with FIGS. 2 and 3, illustrates the fiber waveguide configuration of system 25. The output and input passive fibers of respective oscillators 18, 22 are directly spliced to respective fiber ends of fiber amplifier 20. The diameter of core 28 of active and passive fibers of Tm laser 22 is uniform and can be smaller than that one of core 26 of amplifier 20. Accordingly, the MM light radiated from amplifier or amplifiers 20 is coupled into both the core and cladding of input SM passive fiber 36 of Tm laser 22 with the cladding light being substantially absorbed in core 28 of Tm-doped active fiber 34.

As a possibility, Tm fiber laser 22 may include only a Tm-doped active fiber 38. In this case, the need in input and output passive fibers may not exist, and FBGs 32 can be written directly in Tm-doped active fiber 38. The cladding 40 of Tm laser 22 may be configured with an outer diameter either equal to that one of the cladding of amplifier 20, as shown by dash lines, or smaller than the latter.

The seed laser 18 of the pump is configured with a SM core 24 doped with Er ions. The configuration of seed laser 18 is the same as the one of Tm laser of FIG. 3. The output SM passive fiber of laser 18 is butt-spliced to the input of amplifier 20. Besides the above disclosed configuration, other known structures of seed laser 18 may be used as well within the scope of the disclosure.

FIG. 5 illustrates a modified MM Er or Yb/Er doped core of amplifier 20. The Er amplifier 20 has an active fiber with a MM core 26 doped with Er or Yb/Er ions and capable of supporting propagation of multiple modes. An input passive SM fiber 29 is provided with a core 27 having its diameter at least equal to or, preferably, smaller than that one of the opposing end region of MM core 26 and spliced thereto. The opposite end of active fiber 20 is spliced to an output MM passive fiber 31 which has a core 33 of a diameter at least equal to but preferably larger than the diameter of the opposing end region of MM core 26. The MM core 26 has a relatively large diameter such as of about 100 rpm, whereas the cladding of fiber amplifier 20 may have a diameter of up to 700 µm.

The MM core 26 has generally a double-bottleneck shape. The double bottleneck-shaped cross-section of the MM core is configured with relatively small and preferably uniform end regions 50 and 56, respectively. The end region 50 is preferably larger than the core of input fiber 29, whereas end region 56 is smaller than the core of output fiber 31. It is also preferred that the input fiber of Th laser 22 has the core diameter smaller than the core diameter of the output fiber of fiber amplifier 20. The geometry of the core end regions provide minimal losses when light propagates between the input and output fibers 29 and 31, respectively. However, the other core geometries with substantially equal core diameters of the respective spliced fibers can be selected within the scope of the disclosure. However, any other geometry is still the subject to minimal or no power loss at all at the splices between respective fibers. A relatively large and uniformly configured amplifying region 54 of MM core 26 is flanked by frustoconical transition regions 52 connecting the end and amplifying regions.

Turning briefly to FIGS. 2 and 4, system 25 may be configured without Er seed laser 18. In this case, multimode Er-doped fiber 20 can be configured as a powerful Fabri-Perot oscillator and a resonant cavity is formed in core 26 thereof.

FIG. 6 shows the relationship between the output power of system 25 from the input current coupled to pump laser diodes. It is easy to see that efficiency 44 of presently disclosed system 25 is higher than efficiency 46 of system 10 shown in FIG. 1.

FIG. 7 shows that output power 48 of MM amplifier 20 of FIG. 4 in a CW regime system is insignificantly degraded. The figure further illustrates the stability of the output power 56 of the disclosed Tm laser in a CW mode of operation. No alarming degradation has been detected. The system 25 may operate in a pulsed regime, too.

Returning to FIG. 4, disclosed system 25 may be used in applications requiring longer wavelengths than Tm-doped lasers can generate. Accordingly, system 25 may further include a nonlinear ZnS crystal 60 which may shift the output of Tm laser way beyond 2 µm. The coupling of the output light from Tm-doped laser 22 into crystal 60 is realized by guiding the output beam 22 through a lens unit (not shown) and a collimator 58.

The foregoing description and examples have been set forth merely to illustrate the disclosure and are not intended to be limiting. Accordingly, disclosure should be construed broadly to include all variation within the scope of the appended claims.

The invention claimed is:

1. A single mode (SM) high power fiber laser system comprising:
   a pump having at least one fiber amplifier radiating a multimode (MM) pump light and provided with an active fiber with a multimode core which is doped with ions of rare-earth elements selected from the group consisting of Er and ytterbium/erbium, and
   a fiber laser having a core doped with Tm ions, the Tm fiber laser receiving the MM pump light and radiating a system output at a wavelength of about 2 micron.

2. The fiber laser system of claim 1, wherein the pump laser amplifier is configured with a double bottleneck-shaped cross-section including input and output end regions, a central region between the end regions with a core diameter greater than that one of the end regions, and two frustoconical regions each bridging the end and amplifying regions.

3. The fiber laser system of claim 2, wherein the pump laser amplifier further has a single mode input passive fiber and a multimode output fiber having respective ends spliced to respective ends of the active pump fiber.

4. The fiber laser of claim 3, wherein the opposite end regions of the active fiber of the pump amplifier are spliced to respective opposing ends of the input and output passive fibers, the input fiber having a core with a diameter at least substantially equal to or smaller than the end region of the core of the active fiber opposing the input fiber, and the output fiber having a core with a diameter equal to or larger than the diameter of the end region of the core of the active fiber.

5. The fiber laser of claim 4, wherein the pump further has a seed Er-based fiber laser operative to output a SM radiation coupled into the input passive fiber of the pump amplifier.

6. The fiber laser system of claim 3, wherein the Tm laser is configured with a Tm doped active fiber having a SM configuration.

7. The fiber laser system of claim 3, wherein the Tm laser is configured with a Tm doped active fiber having a MM configuration.

8. The fiber laser of claim 4, wherein the core of the output fiber of the pump is at least equal to or greater than an input fiber delivering a pump light to the Tm laser.

9. The fiber laser system of claim 1, wherein the laser amplifier of the pump has the core provided with a uniform core diameter, the Tm laser being configured with a Tm-doped active fiber and input and output SM passive fibers provided with respective wavelength-selective elements, the core diameter of the active pump fiber being greater than a core diameter of the input passive fiber of the Tm laser.

10. The fiber laser of claim 1, wherein the cores of respective Tm laser and active fiber of the pump amplifier are surrounded by respective claddings, an outer cladding of the Tm laser is smaller than that of one of the active fiber of the pump fiber amplifier.

11. The fiber laser of claim 1 further comprising a plurality of pump amplifiers.

12. The fiber laser of claim 1, wherein the pump has a configuration selected from an oscillator or amplifier.

\* \* \* \* \*